A. F. DESING.
TOOL FOR CLENCHING HORSESHOE NAILS.
APPLICATION FILED JULY 25, 1912.
1,167,803.
Patented Jan. 11, 1916.
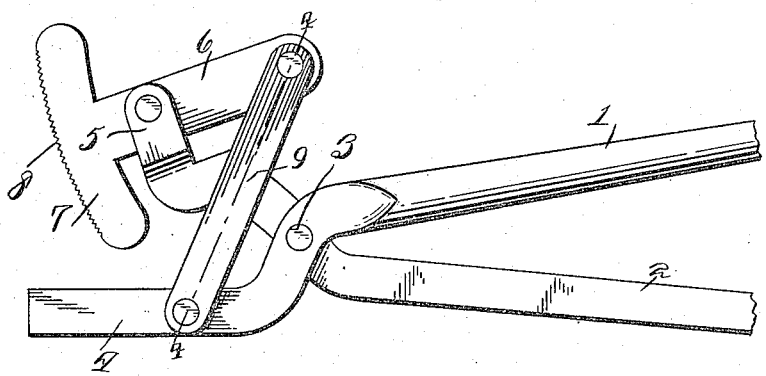
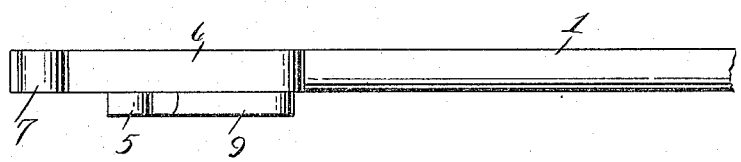
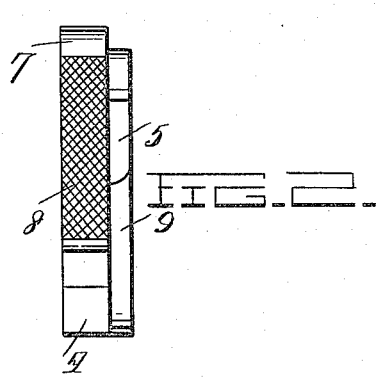
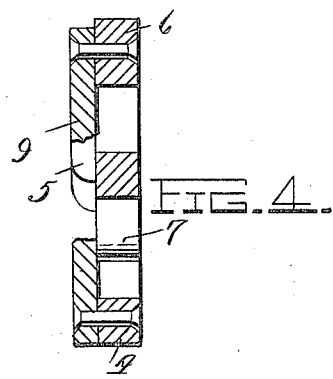
Inventor
A. F. Desing.
Witnesses
By
Attorneys

UNITED STATES PATENT OFFICE.

AUGUST F. DESING, OF ELKHORN, WISCONSIN.

TOOL FOR CLENCHING HORSESHOE-NAILS.

1,167,803.   Specification of Letters Patent.   Patented Jan. 11, 1916.

Application filed July 25, 1912. Serial No. 711,536.

*To all whom it may concern:*

Be it known that I, AUGUST F. DESING, a citizen of the United States, residing at Elkhorn, in the county of Walworth, State of Wisconsin, have invented certain new and useful Improvements in Tools for Clenching Horseshoe-Nails; and I do hereby declare the following to be a full, clear, and exact description of the invention, such as will enable others skilled in the art to which it appertains to make and use the same.

The present invention is directed to improvements in tools for clenching horse shoe nails after the same have been driven into the hoof of the animal, and has for its object to provide a tool of this character which will be exceedingly simple, durable, and one which will expeditiously clench a nail against the hoof of the animal.

With these and other objects in view, this invention resides in the novel features of construction, formations, combinations and arrangements of parts to be hereinafter more fully described, claimed and illustrated, in the accompanying drawing, in which:—

Figure 1 is a side elevation of the device. Fig. 2 is an end view. Fig. 3 is a top plan view. Fig. 4 is a sectional view on line 4—4 of Fig. 1.

Referring to the drawing, the numerals 1 and 2 designate a pair of handles, which are pivotally connected by a pin 3 at their points of crossing.

The handle 1 terminates at one end in a jaw 4, while the handle 2 terminates in an angularly disposed off-set 5, to which is pivotally connected intermediate its ends a shank 6, the outer end of which terminates in an arcuate jaw 7, the outer surface of which is serrated, as at 8.

A link 9 is provided and has one of its ends pivotally connected to the outer end of the shank 6 and its other end similarly connected near the outer end of the jaw 4, whereby when said handles are grasped and forced toward each other the link will swing the shank 6 upwardly and the arcuate jaw 7 inwardly and against the projected end of the horse shoe nail, thus clenching the same in an efficient manner.

The operation of the tool is as follows:— The jaw 4 is placed beneath the horse hoof, thus positioning the arcuate jaw 7 in such a manner that when the handles are forced toward each other the link 9 will be moved upwardly thereby rocking the shank 6 to firmly bring the serrated surface 8 of the jaw in contact with the projected end of the horse shoe nail thus effectually clenching the same.

What is claimed is:—

A horse shoer's clenching pliers, including a pair of pivotally connected crossed handle levers, one of said levers terminating in a fixed jaw, a movable jaw fulcrumed on the end of the other of said levers and provided with an arcuate clenching surface disposed concentrically of said fulcrum, and a link operatively connecting said movable jaw with said fixed jaw.

In testimony whereof, I affix my signature, in presence of two witnesses.

AUGUST F. DESING.

Witnesses:
A. C. OLESON,
HENRY O. L. ADKINS.

Copies of this patent may be obtained for five cents each, by addressing the "Commissioner of Patents, Washington, D. C."